Nov. 29, 1932. J. R. DUNHAM 1,889,063
MEANS FOR LOCKING ANTIFRICTION BEARINGS TO SHAFTS
Filed March 18, 1931
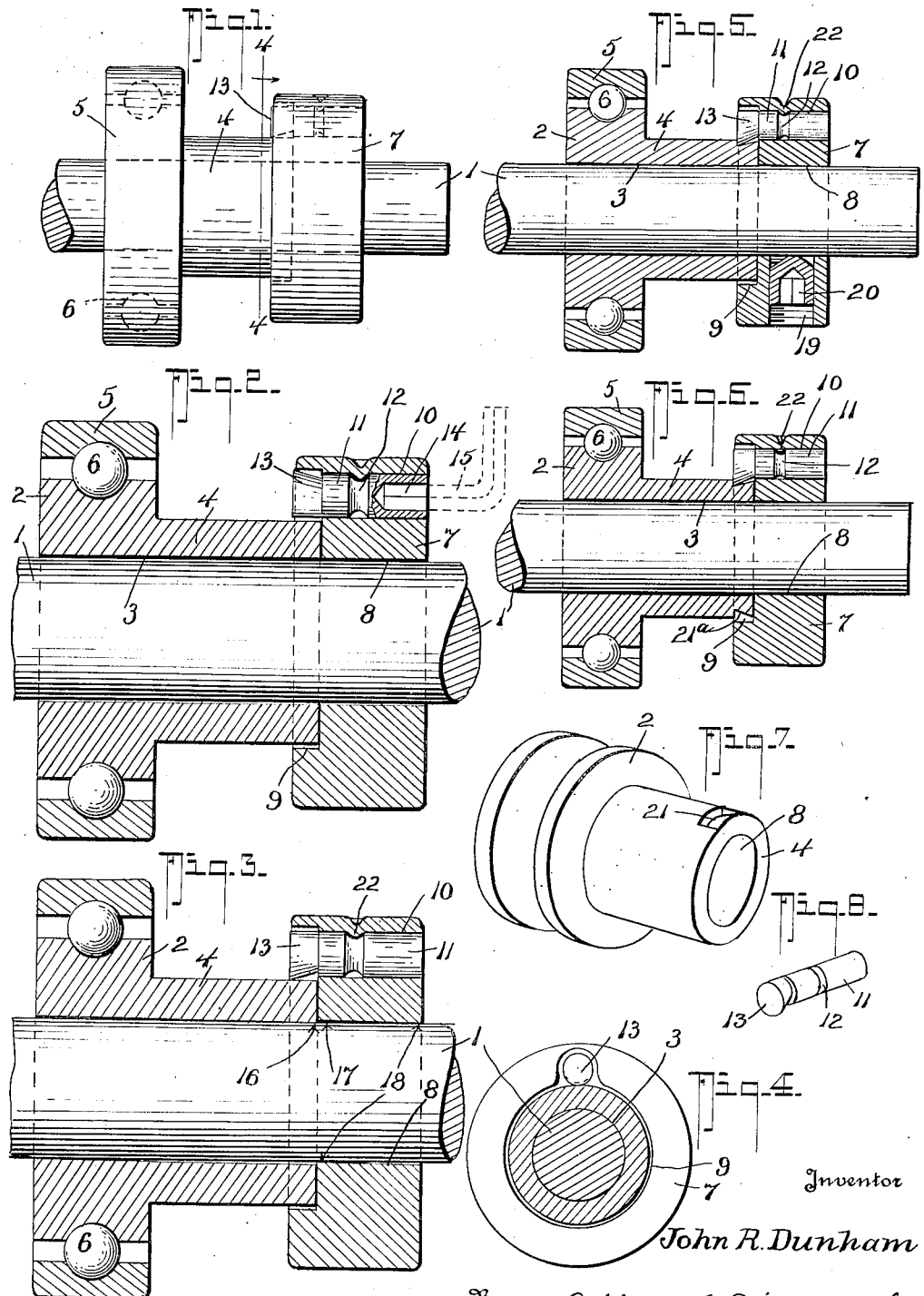

Patented Nov. 29, 1932

1,889,063

UNITED STATES PATENT OFFICE

JOHN RYER DUNHAM, OF NEW BRUNSWICK, NEW JERSEY

MEANS FOR LOCKING ANTIFRICTION BEARINGS TO SHAFTS

Application filed March 18, 1931. Serial No. 523,570.

My invention relates to anti-friction bearings which usually comprise an inner race and an outer race between which suitable anti-friction elements such as balls or rollers are located, and the invention especially has relation to means for locking the inner race to the shaft or spindle on which it is to be fixed.

Primarily, the invention has for its object to provide a simple, effective means for securely holding or locking the bearing at a definite location on a shaft or spindle without the the use of keys, nuts, or set screws between the shaft and the bearing itself, whereby the bearing will be held not only against longitudinal movement on the shaft but will also be kept from rotating on the same. Considerable difficulty has been heretofore encountered to securely hold or lock a ball or other anti-friction bearing in a certain location on a shaft. Several methods have been resorted to in the endeavor to solve this problem. Few have succeeded. Others have failed to answer the purpose, some on account of the high cost of manufacture and others because of their impracticability. There is a tendency of the inner race of an anti-friction bearing to rotate upon the shaft on which it is mounted, and it is an object of my invention to combine an anti-friction bearing with a very simple and substantial mechanism for locking the bearing to a shaft in order to prevent rotation of the bearing on the shaft and also to prevent its creeping along the shaft.

Further, it is an object to provide a device for the purposes stated which employs a locking pin whose axis parallels that of the shaft, so that it becomes unnecessary to hold the bearing against rotation while effecting the locking act.

Further, it is an object to provide a locking collar to carry a rotatable locking pin which has an eccentric for engaging a portion of the anti-friction bearing for the purpose of locking the parts together and to the shaft, which collar remains stationary during the locking and unlocking acts.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a side elevation of one embodiment of the invention.

Figure 2 is an enlarged central vertical longitudinal section of the same, the parts being in the unlocking position, the amount of play between the shaft and the bearing and between the shaft and the collar being exaggerated for purposes of illustrating the action that takes place in locking the parts together.

Figure 3 is a view similar to Figure 2 showing the parts locked together.

Figure 4 is a cross section on the line 4—4 of Figure 1.

Figure 5 is a central vertical longitudinal section of a modification of the invention.

Figure 6 is a central vertical longitudinal section of a further modification.

Figure 7 is a detail perspective view of the inner bearing race and its sleeve shown in Figure 5.

Figure 8 is a perspective view of one of the locking pins.

In the drawing, in which like numerals of reference indicate like parts in all of the figures, 1 represents a shaft, spindle, rod or other part on which the anti-friction bearing is to be mounted. The bearing illustrated in the drawing consists of an inner race 2 having a bore 3 to fit the shaft 1 with a sliding fit and having a sleeve 4 of suitable length to cooperate with the locking collar 7. The outer race 5 cooperates with the bearing element 6 and the inner race 2 as an anti-friction bearing unit.

The locking collar, which also fits the shaft 1 with a sliding fit, is bored at 8 to receive the shaft and is preferably counterbored at 9 to receive the adjacent end of the sleeve 4.

The collar 7 is also provided with a cylindrical bore 10 for the location of the rotatable locking pin 11, the latter having a groove 12 and the collar 7 having a depression or nib 22 cooperating with the groove 12 to hold the locking pin 11 in its socket 10 against longitudinal movement therein while permitting the pin to be rotated.

The locking pin 11 carries an eccentric head 13 preferably coni-form, the latter lying in an extension of the counterbore 9. In this way the pin head 13 is protected against injury.

A key receiving recess 14 is formed in the end of the pin 11 that is opposite to the head 13 for the reception of a suitable key 15 by means of which the pin 11 may be turned on its axis to lock or unlock the parts.

If desired, the sleeve 4 may be provided with a recess 21 preferably having its bottom inclined or bevelled as shown especially in Figures 5 and 7, the recess being provided for the reception of the locking pin's head 13, or the sleeve 4 may be provided with an annular groove 21a as indicated in Figure 6, the bottom of which is preferably bevelled or inclined as shown. The locking head 13 of the locking pin is, as before stated, of coni-form, the larger diameter being at the outermost end of the head to cooperate with the deepest part of the groove 21a or the recess 21.

If desired the locking collar 7 may also be provided with a set screw bore 19 suitably threaded to receive the set screw 20. When so provided the bore 19 is preferably located diametrically opposite the place where the pin 11 is located, so that the set screw 20 when tightened up will exert pressure tending to assist the function of the locking pin 11.

It should also be mentioned that the locking head 13 is arranged eccentrically to the axis of the pin 11 so that when turned to the position shown in Figure 2 the parts will be unlocked, or when turned to the positions shown in Figures 3, 5 and 6 the parts will be locked together.

The use of the set screw 20 is not essential on most bearings as I find from practical experience that the smaller size bearings hold sufficiently without employing the set screw 20, though the use of the set screw 20 in combination with the locking pin is a safeguard to insure a positive locking of the collar 7 to the shaft 1 and this is especially desirable in the larger size bearings.

Furthermore, the presence of the recess 21 or groove 21a is not always required, since in the smaller size bearings particularly the sleeve 4 may be left of uniform diameter as shown in Figures 1 to 4 inclusive as the sharp edge of the eccentric 13 will bite onto the sleeve 4 with sufficient pressure to prevent separatory movement between the collar 7 and the sleeve along the axis of the shaft after the key 11 has been turned to lock the parts together.

When the parts are locked together, as shown in Figure 3, the tendency is to cant the bearing and its sleeve slightly and also to cant the locking collar in such way as to produce greatest gripping pressures at 16 and 18 and thereby effect a tight frictional engagement between the bearing and locking collar on the one hand and the shaft on the other.

The recessing of the sleeve 4 into the locking collar 7 is for the purpose of providing a guard flange around the sleeve and around the head 13 of the locking pin so as to prevent anything being caught or any person being injured by coming in contact with the locking pin during rotation of the shaft and bearing.

The recess 21 may be angular or straight sided as may be desired.

It will be observed by the use of my construction that there is no tendency during the locking operation for the bearing elements 2, 4 to turn on the shaft and no relative turning movement between the bearing element and the collar is necessary to effect a locking action. All other devices for the same purpose with which I am familiar must be held against rotation with wrenches and pins to prevent rotation of the center race of the bearing while the locking action is taking place. In my invention it is only necessary to have the key or wrench 15 to operate the locking pin.

While I prefer to make the locking head 13 of coni-form it is obvious that it may be made angular with straight sides as an ordinary eccentric, if desired. Such a locking head will function nearly as well as the coni-form head 13 particularly where it cooperates with a groove or recess such as the groove 21a or recess 21 shown in Figures 6 and 7.

Other modifications of the invention can be made without departing from the spirit of the same or the scope of the appended claims.

From the foregoing description, taken in connection with the accompanying drawing, it is thought the complete construction, operation and advantages of my invention will be clear to those skilled in the art to which it relates.

What I claim is:

1. In apparatus wherein there is provided a shaft and an apertured element to be secured thereon; a locking collar, said element and said collar being fitted on said shaft with a sliding fit, and a locking pin mounted in said collar with its axis parallel to that of the collar and having an eccentric head to engage said element, and means through which said pin may be turned to lock the parts together and unlock the same while holding the collar and said element against relative movement.

2. In apparatus wherein there is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts while holding the collar and said element against relative movement.

3. In apparatus wherein there is provided a shaft and an element to be secured thereon; a locking collar, said element and said collar fitted on said shaft with a sliding fit, and a locking pin mounted in said collar with its axis parallel to that of the collar and having an eccentric head to engage said element, and means through which said pin may be turned to lock the parts together and unlock the same, while holding the collar and said element against relative movement said collar being recessed to receive said eccentric head and the adjacent end of said sleeve.

4. In apparatus wherein there is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts, while holding the collar and said element against relative movement said collar being recessed to receive said eccentric portion and the adjacent end of said sleeve.

5. In apparatus wherein there is provided a shaft and an element to be secured thereon; a locking collar, said element and said collar fitted on said shaft with a sliding fit, and a locking pin mounted in said collar with its axis parallel to that of the collar and having an eccentric head to engage said element, and means through which said pin may be turned to lock the parts together and unlock the same, and a set screw carried by said collar to cooperate with said locking pin.

6. In apparatus wherein there is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts, and a set screw carried by said collar to cooperate with said locking pin.

7. In apparatus wherein is provided a shaft and an element to be secured thereon; a locking collar, said element and said collar fitted on said shaft with a sliding fit, and a locking pin mounted in said collar with its axis parallel to that of the collar and having an eccentric head to engage said element, and means through which said pin may be turned to lock the parts together and unlock the same, while holding the collar and said element against relative movement and a set screw carried by said collar at a place diametrically opposite the place where said locking pin is located for engaging said shaft and cooperating with said pin substantially as described.

8. In apparatus wherein there is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts, while holding the collar and said element against relative movement and a set screw carried by said collar at a place diametrically opposite the place where said locking pin is located for engaging said shaft and cooperating with said pin, substantially as described.

9. In apparatus wherein is provided a shaft and an element to be secured thereon; a locking collar, said element and said collar fitted on said shaft with a sliding fit, and a locking pin mounted in said collar with its axis parallel to that of the collar and having an eccentric head to engage said bearing element, and means through which said pin may be turned to lock the parts together and unlock the same, said collar having a cylindrical bore to receive said locking pin and being provided with means to hold said pin against movement longitudinally while permitting it to be rotated about its axis.

10. In apparatus wherein is provided a shaft and an element to be secured thereon; a locking collar, said element and said collar fitted on said shaft with a sliding fit, and a locking pin mounted in said collar with its axis parallel to that of the collar and having an eccentric head to engage said element, and means through which said pin may be turned to lock the parts together and unlock the same, said element having a recess to receive the head of said locking pin when in the locked position.

11. In apparatus wherein there is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts, said element having a recess to receive the eccentric portion of said locking pin when in the locked position.

12. In apparatus wherein is provided a shaft and an element to be secured thereon; a locking collar, said element and said collar fitted on said shaft with a sliding fit, and a locking pin mounted in said collar with its axis parallel to that of the collar and having an eccentric head to engage said element, and means through which said pin may be turned to lock the parts together and unlock the same, said element having an inclined-bottom recess to receive the head of said locking pin when in the locking position and said locking pin's head being of coni-form to cooperate with said recess for the purposes specified.

13. In apparatus wherein is provided a shaft and an element having a sleeve fitting said shaft with a sliding fit; a locking collar on said shaft adjacent one end of said sleeve, a rotatable locking pin carried by said collar and having an eccentric portion to engage the periphery of the sleeve adjacent to said collar for causing said sleeve and collar to grip said shaft and hold the several parts against movement relatively one to the other, and means in virtue of which said pin may be turned to lock or release the parts, said element having an inclined-bottom recess to receive the eccentric portion of said locking pin when in the locking position and said locking pin's eccentric portion being of coni-form to cooperate with said recess for the purposes specified.

14. In apparatus wherein there is provided a shaft and an element having a sleeve fitting said shaft with a sliding fit; a locking collar on said shaft adjacent one end of said sleeve, a locking pin rotatably mounted in and carried by said sleeve, means holding said pin against separation from said sleeve, said sleeve and said pin having interlocking portions in virtue of which when said pin is partly turned with said portions in register said collar and said sleeve will be held against relative movement toward and from one another, while leaving said sleeve and said collar free to slide along said shaft.

15. In apparatus wherein there is provided a shaft and an element having a sleeve fitting said shaft with a sliding fit; a locking collar on said shaft adjacent one end of said sleeve, a locking pin rotatably mounted in and carried by said sleeve, means holding said pin against separation from said sleeve, said sleeve and said pin having interlocking portions in virtue of which when said pin is partly turned with said portions in register said collar and said sleeve will be held against relative movement toward and from one another, while leaving said sleeve and said collar free to slide along said shaft, said interlocking portions including an eccentric head on said locking pin which, when said pin is turned to tighten its engagement with said sleeve, will lock said collar and said sleeve to said shaft.

16. In apparatus wherein there is provided a shaft and an element having a sleeve fitting said shaft with a sliding fit; a locking collar on said shaft adjacent one end of said sleeve, a locking pin rotatably mounted in and carried by said sleeve, means holding said pin against separation from said sleeve, said sleeve and said pin having interlocking portions in virtue of which when said pin is partly turned with said portions in register said collar and said sleeve will be held against relative movement and when said pin is turned further said pin will cause said collar and said sleeve to become locked on said shaft.

17. In apparatus wherein there is provided a shaft and an element having a sleeve fitting said shaft with a sliding fit; a locking collar on said shaft adjacent one end of said sleeve, a locking pin rotatably mounted in and carried by said sleeve, means holding said pin against separation from said sleeve, said sleeve and said pin having interlocking portions in virtue of which when said pin is partly turned with said portions in register said collar and said sleeve will be held against relative movement toward and from one another, while leaving said sleeve and said collar free to slide along said shaft, said interlocking portions comprising an inwardly tapered head on said pin and an inwardly tapered recess on said collar.

JOHN RYER DUNHAM.